United States Patent
Cho et al.

(10) Patent No.: US 9,640,225 B2
(45) Date of Patent: May 2, 2017

(54) APPARATUS AND METHOD FOR PROCESSING IMAGES

(71) Applicant: HANWHA TECHWIN CO., LTD., Changwon-si (KR)

(72) Inventors: Sung Bong Cho, Changwon-si (KR); Sung Hoon Lee, Changwon-si (KR); Seok Ho Chae, Changwon-si (KR); Hyo Jin Kim, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 326 days.

(21) Appl. No.: 14/450,745

(22) Filed: Aug. 4, 2014

(65) Prior Publication Data
US 2015/0139602 A1 May 21, 2015

(30) Foreign Application Priority Data
Nov. 18, 2013 (KR) .................. 10-2013-0140089

(51) Int. Cl.
*H04N 5/77* (2006.01)
*G11B 31/00* (2006.01)
*H04N 19/117* (2014.01)
*H04N 19/172* (2014.01)
*H04N 19/136* (2014.01)
*H04N 19/132* (2014.01)
*H04N 19/156* (2014.01)

(52) U.S. Cl.
CPC ......... *G11B 31/006* (2013.01); *H04N 19/117* (2014.11); *H04N 19/132* (2014.11); *H04N 19/136* (2014.11); *H04N 19/156* (2014.11); *H04N 19/172* (2014.11)

(58) Field of Classification Search
CPC .. H04N 19/132; H04N 19/156; H04N 19/136; H04N 19/117; G11B 31/006
USPC .............................. 386/223; 348/47
See application file for complete search history.

(56) References Cited

U.S. PATENT DOCUMENTS

| 2006/0146931 | A1  | 7/2006  | Boyce |
| 2009/0122875 | A1  | 5/2009  | Den Hollander |
| 2010/0303436 | A1* | 12/2010 | Chang .................... H04N 5/765 386/223 |
| 2011/0102634 | A1* | 5/2011  | Pardue .................. H04N 7/181 348/231.9 |
| 2013/0235209 | A1* | 9/2013  | Lee ........................ H04N 5/765 348/159 |

FOREIGN PATENT DOCUMENTS

| JP | 2007-524280 A | 8/2007 |
| KR | 10-2000-0009075 A | 2/2000 |
| KR | 10-2008-0000579 A | 1/2008 |

\* cited by examiner

*Primary Examiner* — Thai Tran
*Assistant Examiner* — Jose Mesa
(74) *Attorney, Agent, or Firm* — Sughrue Mion, PLLC

(57) ABSTRACT

Provided are an image processing apparatus and method for processing images. The image processing apparatus is connected to at least one camera and includes: a performance calculating unit configured to calculate a decoding performance of the at least one camera based on information about at least one of a codec, a resolution and a frame rate of image frames which are received from the at least one camera, and a filtering unit configured to filter the received image frames to select image frames for decoding, based on a result of the calculation of the decoding performance of the at least one camera.

18 Claims, 4 Drawing Sheets

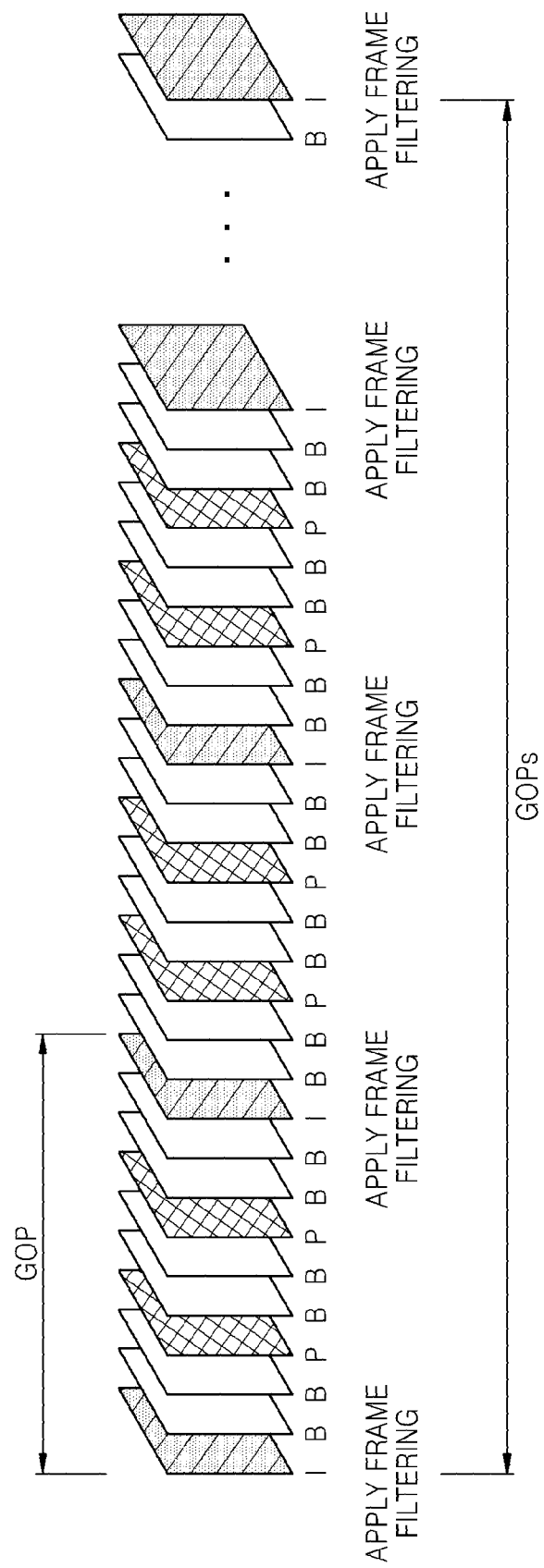

APPARATUS AND METHOD FOR PROCESSING IMAGES

CROSS-REFERENCE TO RELATED APPLICATION

This application claims priority from Korean Patent Application No. 10-2013-0140089, filed on Nov. 18, 2013, in the Korean Intellectual Property Office, the disclosure of which is incorporated herein in its entirety by reference.

BACKGROUND

1. Field

Apparatuses and methods consistent with exemplary embodiments relate to processing images where specific frames are selectively decoded among received images, when performance required for decoding images received from at least one camera exceeds decoding performance internally.

2. Description of the Related Art

An apparatus for recording and storing images such as a digital video recorder or a network video recorder is connected to at least one surveillance camera, stores images received from selected cameras, performs decoding and display processing, and outputs results to a monitor.

In such an apparatus for recording and storing images, a highest decoding performance at which a decoder can decode image frames is internally preset. When the decoder exceeds the highest decoding performance, no image frames may be provided to the decoder. In other words, a queue where image frames are stored for decoding is full, and no more additional image frames may be stored in the queue. In this state, frame drops occur, and accordingly, arbitrary image frames are not decoded.

After the frame drops occur, a decoder may resume normal decoding. However, after frame-drops and a following normal operation of the decoder, a lapse of a certain amount of time causes the decoder again to exceed the preset highest decoding performance, and thus, a state of queue-fullness and frame-drop are repeated. Accordingly, in the end, images displayed on a monitor may be stopped and re-started, or a picture-gap may repeatedly occur, which is an inconvenience.

SUMMARY

The inventive concept will be set forth in part in the description which follows and, in part, will be apparent from the description, or may be learned by practice of the presented exemplary embodiments.

A technical aim to be solved by the exemplary embodiments is to provide an apparatus and a method of processing images which may enable to monitor images without picture-gaps by selective decoding of specific image frames among image frames received from at least one camera if the internally preset decoding performance is exceeded at a time of decoding the image frames received from the at least one camera, and by preventing or minimizing states of queue-fullness and phenomena of frame-drop.

According to an aspect of an exemplary embodiment, there is provided an image processing apparatus connected to at least one camera. The image processing apparatus may include: a performance calculating unit configured to calculate a decoding performance of the at least one camera based on information about at least one of a codec, a resolution and a frame rate of image frames which are received from the at least one camera; and a filtering unit configured to filter the received image frames to select image frames for decoding, based on a result of the calculation of the decoding performance of the at least one camera.

The at least one camera may be a plurality of cameras, and the filtering unit may be configured to select the image frames for decoding by comparing a sum of respective decoding performances of the plurality of cameras calculated by the performance calculating unit with a decoding performance of the image processing apparatus.

The filtering unit may be configured to select the image frames for decoding, if the sum exceeds the decoding performance of the image processing apparatus. The filtering unit may not select the image frames for decoding, and instead may provide all of the image frames received from the plurality of cameras for decoding, if the sum does not exceed the decoding performance of the image processing apparatus.

The performance calculating unit may be configured to calculate the decoding performance of the at least one camera by multiplying a weight value assigned to the codec, the resolution and the frame rate of the received image frames.

Different weight values may be assigned to the codec depending on a type of the codec.

The filtering unit may be configured to periodically select the image frames for decoding.

The selected image frames for decoding may be intra-frames among the image frames received from the at least one camera in a group of pictures (GOP) unit.

The selected image frames may be image frames received from a camera having the highest or lowest decoding performance among the at least one camera.

The selected image frames may be image frames received from one or more cameras selected from among the at least one camera.

The filtering unit may be configured to change a number of the selected image frames based on a condition of at least one channel through which the image frames are received from the at least one camera.

According to an aspect of another exemplary embodiment, there is provided a method of processing image frames received from at least one camera. The method may include: calculating a decoding performance of the at least one camera based on information about a codec, a resolution and a frame rate of the received image frames; and filtering the received image frames to select image frames for decoding, based on a result of the calculation of the decoding performance of the at least one camera.

The at least one camera may be a plurality of cameras, and the filtering may be performed based on a result of comparing a sum of respective decoding performances of the plurality of cameras with a decoding performance of the image processing apparatus.

The filtering may be performed if the sum exceeds the decoding performance of the image processing apparatus. The filtering may not be performed and all of the image frames received from the plurality of cameras may be provided for decoding, if the sum does not exceed the decoding performance of the image processing apparatus.

The decoding performance of the at least one camera may be calculated by multiplying a weight value assigned to the codec, the resolution and the frame rate of the received image frames.

Different weight values may be assigned to the codec depending on ta type of the codec.

In the filtering, the image frames for decoding may be periodically selected.

The selected image frames for decoding may be infra-frames among the image frames received from the at least one camera in a group of picture (GOP) unit.

The selected image frames may be image frames received from a camera having the highest or lowest decoding performance among the at least one camera.

The selected image frames may be image frames received from one or more cameras selected from among the at least one camera.

In the filtering, a number of the selected image frames may be changed based on a condition of at least one channel through which the image frames are received from the at least one camera.

BRIEF DESCRIPTION OF THE DRAWINGS

These and/or other aspects will become apparent and more readily appreciated from the following description of the exemplary embodiments, taken in conjunction with the accompanying drawings, in which:

FIGS. 2A and 2B are a diagram illustrating operations of a filtering unit in FIG. 1, according to exemplary embodiments.

DETAILED DESCRIPTION OF THE EXEMPLARY EMBODIMENTS

Figure 1:
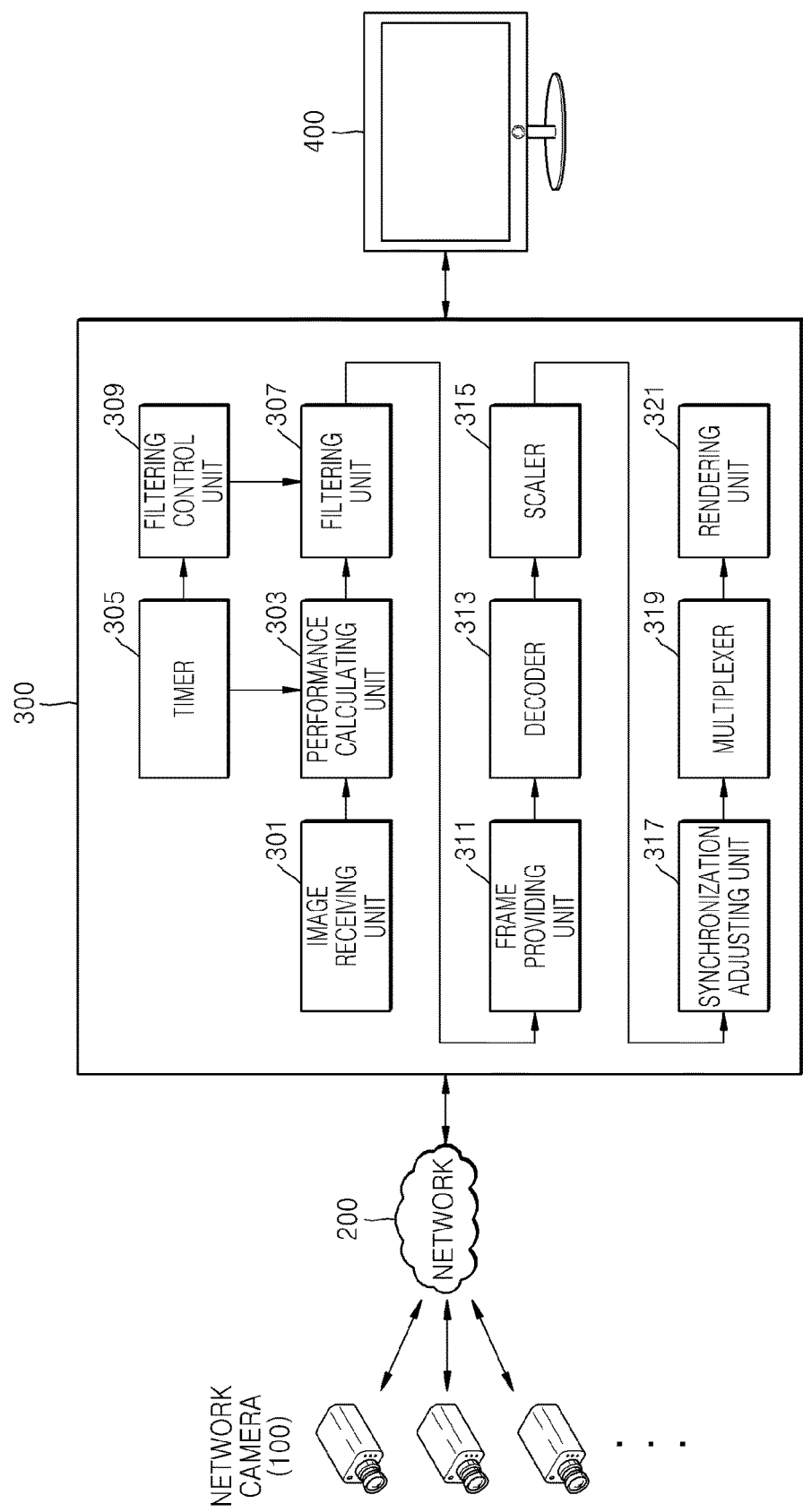
FIG. 1 is a block diagram illustrating a configuration of an apparatus for processing images, according to an exemplary embodiment.

Reference will now be made in detail to exemplary embodiments, which are illustrated in the accompanying drawings, wherein like reference numerals refer to like elements throughout. In this regard, the embodiments may have different forms and should not be construed as being limited to the descriptions set forth herein. Accordingly, the embodiments are merely described below, by referring to the figures, to explain aspects of the inventive concept.

While such terms as "first", "second", etc., may be used to describe various components, such components must not be limited to the above terms. The above terms are used only to distinguish one component from another. The terms used in the present specification are merely used to describe particular embodiments, and are not intended to limit the inventive concept. An expression used in the singular encompasses the expression of the plural, unless it has a clearly different meaning in the context. In the present specification, it is to be understood that the terms such as "including", "having", and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

The exemplary embodiments may be described in terms of functional blocks of components or units (e.g., FIG. 1) and various processing steps. Such functional blocks may be realized by any number of hardware and/or software components configured to perform the specified functions. For example, the functional blocks may employ various integrated circuit (IC) components, e.g., memory elements, processing elements, logic elements, look-up tables, and the like, which may carry out a variety of functions under the control of one or more microprocessors or other control devices. Similarly, where the elements of the functional blocks are implemented using software programming or software elements, the embodiments may be implemented with any programming or scripting language such as C, C++, Java, assembler language, or the like, with the various algorithms being implemented with any combination of data structures, objects, processes, routines or other programming elements. Functional aspects may be implemented in algorithms that are executed on one or more processors. Furthermore, the inventive concept could employ any number of related art techniques for electronics configuration, signal processing and/or control, data processing and the like. The words "mechanism", "element", "means", and "configuration" are used broadly and are not limited to mechanical or physical embodiments, but can include software routines in conjunction with processors, etc.

FIG. 1 is a block diagram illustrating a configuration of an apparatus for processing images, according to an exemplary embodiment. Referring to FIG. 1, the apparatus for processing images includes at least one camera, for example, a plurality of network cameras 100, a network 200, an image processing unit 300, and a display unit 400.

A network camera 100 is installed at an arbitrary area and outputs captured images as digital image signals, through the network 200, to the image processing unit 300 such as a digital video recorder or a network video recorder. The network camera 100 may be a speed dome camera which is placed at a fixed location in a specific area. Also, the network camera 100 may include a single fixed camera which is equipped with a fixed lens and has a fixed capturing range, or include a pan-tilt-zoom (PTZ) camera with a variable capturing range. A single PTZ camera may easily change various surveillance ranges by a pan movement for a rotation in a horizontal direction, a tilt movement for a rotation in a vertical direction, and a zoom in/zoom out movement.

The image processing unit 300 receives and stores images captured by at least one network camera 100, calculates a first decoding performance of each of the cameras 100 or a corresponding channel based on information about a codec, a resolution, and a frame rate of images received by each of the cameras 100, and when a sum of the first decoding performances of the cameras 100 exceeds a pre-stored second decoding performance corresponding to a decoding performance of the apparatus for processing images, selects and decodes specific frames from the images received per channel. Detailed explanation on the image processing unit 300 is provided below.

The display unit 400 displays images processed by the image processing unit 300. The display unit 400 may display images by dividing at least one channel image which a user desires to monitor. In other words, the display unit 400 may divide a screen into 2, 4, 8, etc. sections and display each channel image on each divided section. The display unit 400 may include at least one of a liquid crystal display (LCD), an organic light-emitting diode (OLED) display, an electrophoretic display (EPD), a flexible display, and a three-dimensional (3D) display.

Detailed description of the image processing unit 300 is as follows. The image processing unit 300 illustrated in FIG. 1 includes an image receiving unit 301, a performance calculating unit 303, a timer 305, a filtering unit 307, a filtering control unit 309, a frame providing unit 311, a decoder 313, a scaler 315, a synchronization adjusting unit 317, a multiplexer 319, and a rendering unit 321.

The image receiving unit 301 receives images captured by at least one network camera 100. The image receiving unit 301 assigns at least one network addresses to at least one network camera 100, respectively, and receives images captured by at least one network camera 100 having the assigned network addresses.

More than one network camera 100 may be selected by a user to monitor images captured by these selected network cameras 100, and the image receiving unit 301 may receive encoded images captured by the selected network cameras 100. For example, when the user selects first through fourth network cameras 100, among first through $n^{th}$ network cameras 100, to monitor images captured by the first through fourth network cameras 100, the image receiving unit 301 may receive encoded images captured by only the first through fourth network cameras 100.

Images received from the at least one network camera 100 include intra-frames (I-frames), predicted-frames (P-frames), and bidirectional frames (B-frames), which are included in an image frame group of pictures (GOP). The I-frame, as a key frame, is an independent frame compressible without a reference to previous frames and has a best picture quality and a largest capacity compared to the other frames. The P-frame is composed based on information about previous I-frames or previous P-frames and has an intermediate level of picture quality and capacity. The P-frame compresses changed contents only with a reference to previous I-frames or previous P-frames. The I-frame and P-frame are used as reference frames of other frames. The B-frame has a lowest level of picture quality and capacity and requires previous and post reference frames for compression, that is, the I-frame and the P-frame.

The performance calculating unit 303 calculates the first decoding performance of each of the selected cameras by summing or multiplying a codec, a resolution, and a frame rate of images received from each of the selected cameras.

The first decoding performance may vary depending on an image codec such as H.264, MPEG-4, and JPEG. When images per codec are compared, MPEG-4 has one third of the compression rate of JPEG on an identical picture quality level, while H.264 has one fifth of the compression rate of JPEG, and the amount of computations for decoding are inversely proportional to a compression rate. In other words, when the decoding performance of JPEG is 1.0, MPEG-4 requires three times of the decoding performance of JPEG and H.264 requires five times of the decoding performance of JPEG. The numbers such as three or five may vary depending on the codec materialized on an apparatus for processing images. Accordingly, the type of codec may be defined as a factor for determining the first decoding performance.

When the first decoding performance is determined based on a same codec, a resolution mostly affects the first decoding performance. This is because access to a memory (not illustrated) corresponding to a picture size and an amount of computations increase in proportion to the resolution. When the first decoding performance is determined based on a same codec, the first decoding performance is proportional to the resolution. For example, compared with a 740×480 resolution (320,000 pixels), a 1,920×1,080 resolution (2 million pixels) shows a six-fold improvement in the first decoding performance. In other words, the first decoding performance may also be defined according to the resolution.

Lastly, the first decoding performance may vary by the number of input frames per second, or by the frame rate, which are input to decode by a hardware codec as well as a software codec. For example, a case of thirty input frames per second may show a first decoding performance that is thirty-times that of one input frame per second.

Accordingly, the performance calculating unit 303 may calculate the first decoding performance of one camera as a multiple of the codec, the resolution, and the frame rate of images received through the camera. In the case of a codec, a weight value may be differently assigned depending on the type of codec, and 1.0 may be assigned to H.264, 0.7 to MPEG-4, and 0.5 to JPEG. Here, the weight value is a value used to calculate the first decoding performance about a codec.

Since a frame rate may continuously change as images are received, the timer 305 measures the frame rate to check an image frame overflow received by the image processing unit 300.

The performance calculating unit 303 may calculate the first decoding performance in a different way depending on a rendering technology of a scaling factor and video graphics array (VGA) when a related art personal computer (PC) system uses a software codec. In this case, a value affecting the first decoding performance is a scaling factor, which may be defined as a ratio of an image area on a screen to a value of an original image area. Also, an interpolation technique for scaling may affect calculating the first decoding performance. Calculation by interpolation techniques such as Bi-Linear, Bi-Cubic, etc. may affect calculating the first decoding performance. A recently-released VGA card, installed on a PC, may selectively determine to use such an interpolation technique at a rendering operation. Thus, the first decoding performance in a related art PC system may be calculated by the performance calculating unit 303 as a multiple of the codec (i.e., H.264, MPEG-4, or JPEG), the resolution, the frame rate, the scaling factor, and the interpolation factor.

The performance calculating unit 303 compares a sum of the respective first decoding performances for image frames received from the at least one network camera with a second decoding performance corresponding to a pre-stored decoding performance of the image processing unit 300 and determines whether the sum of the first decoding performances exceeds the second decoding performance.

For example, when if the pre-stored second decoding performance is 4CH×H.264×(1920×1080)×30 frames per second (FPS) and the sum of respective first decoding performances for images received from the selected first through the fourth network cameras 100 is 4CH×H.264×(1920×1080)×30 FPS, the sum of the respective first decoding performances does not exceed the second decoding performance. However, if the sum of the respective first decoding performances for images received from the first through third cameras 100 is 3CH×H.264×(1920×1080)×30 FPS and the first decoding performance for images received from the fourth network camera 100 is 1CH×H.264×(1920×1080)×60 FPS, the sum of the respective first decoding performances exceeds the second decoding performance.

The filtering unit 307 performs filtering such that only I-frames are selected among image frames received from the selected cameras, for example, the first through fourth network cameras 100, if the sum of the respective first decoding performances exceeds the second decoding performance. Also, the filtering unit 307 may be configured to perform filtering such that only I-frames are periodically selected among image frames received from the selected cameras, if the sum of the respective first decoding performances exceeds the second decoding performance.

Figure 2B:
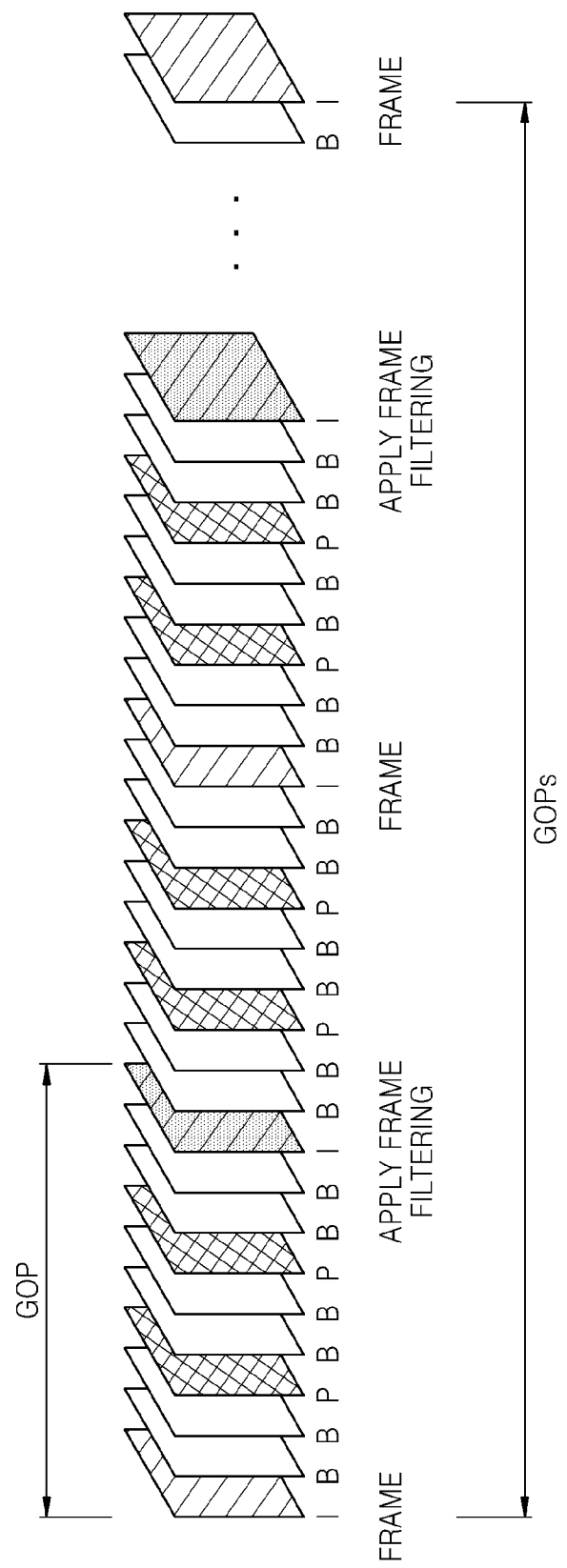

FIGS. 2A and 2B are diagrams illustrating operations of the filtering unit 307, respectively. FIG. 2A illustrates that an MPEG codec is used to perform filtering such that only I-frames are selected among image frames received in a unit of GOP and other B-frames and P-frames are filtered out. FIG. 2B illustrates that the MPEG codec is used to perform filtering such that only I-frames are periodically selected among image frames received in a unit of GOP and B-frames and P-frames are filtered out.

Thus, if the sum of the respective first decoding performances exceeds the second decoding performance, the filtering unit 307 performs filtering such that only I-frames are selected among image frames received from selected cameras or only I-frames are periodically selected, and provides the I-frames to the decoder 313. Then, a monitoring of frames without picture-gaps may be realized by preventing or minimizing full-queue situations and frame drops.

The filtering control unit 309 controls the filtering unit 307 to filter I-frames.

The filtering control unit 309 may control the filtering such that only I-frames are selected among image frames received from cameras having a highest first decoding performance or only I-frames from these cameras are periodically selected. In the case there are image frames received from a small number of cameras with a first decoding performance that is more than a threshold value and there are image frames received from a large number of cameras having a first decoding performance that is more than the threshold value, the filtering control unit 309 may control the filtering such that image frames received from the small number of cameras are filtered and all image frames received from the large number of cameras are unfiltered and provided to the decoder 313.

Also, the filtering control unit 309 may control the filtering such that only I-frames are selected among image frames received from cameras having a lowest first decoding performance or only I-frames from these cameras are periodically selected. In a case there are image frames received from a small number of cameras having a first decoding performance that is less than a threshold value and there are image frames received from a large number of cameras having a first decoding performance that is less than the threshold value, the filtering control unit 309 may control the filtering such that image frames received from the large number of cameras are filtered and all image frames received from the small number of cameras are unfiltered and provided to the decoder 313.

The filtering control unit 309 may select cameras of which image frames are to be filtered by the filtering unit 307 and control filtering by the filtering unit 307 such that only I-frames among image frames received from the selected cameras may be selected or only I-frames from these cameras are periodically selected. The cameras, of which image frames are to be filtered by the filtering unit 307, may be selected by the user either in an ascending order from the first camera or in a descending order from the $n^{th}$ camera or in a random order. For example, if cameras are selected in an ascending order from the first camera, the filtering control unit 309 may control the filtering such that only I-frames are selected among image frames received from the selected cameras or are periodically selected until the sum of the respective first decoding performances becomes less than the second decoding performance. Since the user knows that the filtering unit 307 is firstly applied to image frames received from the first camera, the filtering controlling provides an advantage that specific cameras may be selected to see all image frames.

The filtering control unit 309 may further control the filtering unit 307 to change a frequency of filtering image frames received by selected cameras, for example, a small number of or specific cameras having the highest first decoding performance. For example, when a frame rate of image frames received from the first camera is 30 FPS and a unit GOP, i.e., the number of pictures or image frames in a GOP, is 15, the filtering unit 307 may be controlled to provide two I-frames per second to the decoder 313. However, the filtering control unit 309 may control the filtering unit 307 with weight values that are applied to provide one I-frame per second to the decoder 313 or to provide one I-frame per two seconds to the decoder 313. In this case, the filtering control unit 309 may control filtering, by adjusting I-frame gaps of image frames from a camera having the first decoding performance that is more than the threshold value, such that all image frames from the other cameras are provided to the decoder 313.

The frame providing unit 311 provides I-frames selected after filtering by the filtering unit 307 or all unfiltered image frames to the decoder 313. The decoder 313 decodes image frames provided by the frame providing unit 311. The scaler 315 adjusts a size of the decoded image frames, and the synchronization adjusting unit 317 adjusts synchronization of image frames and audio. The multiplexer 319 synthesizes image frames and produces one final output image. The rendering unit 321 performs a series of processes to display one final output image according to specifications of the display unit 400.

Figure 3:
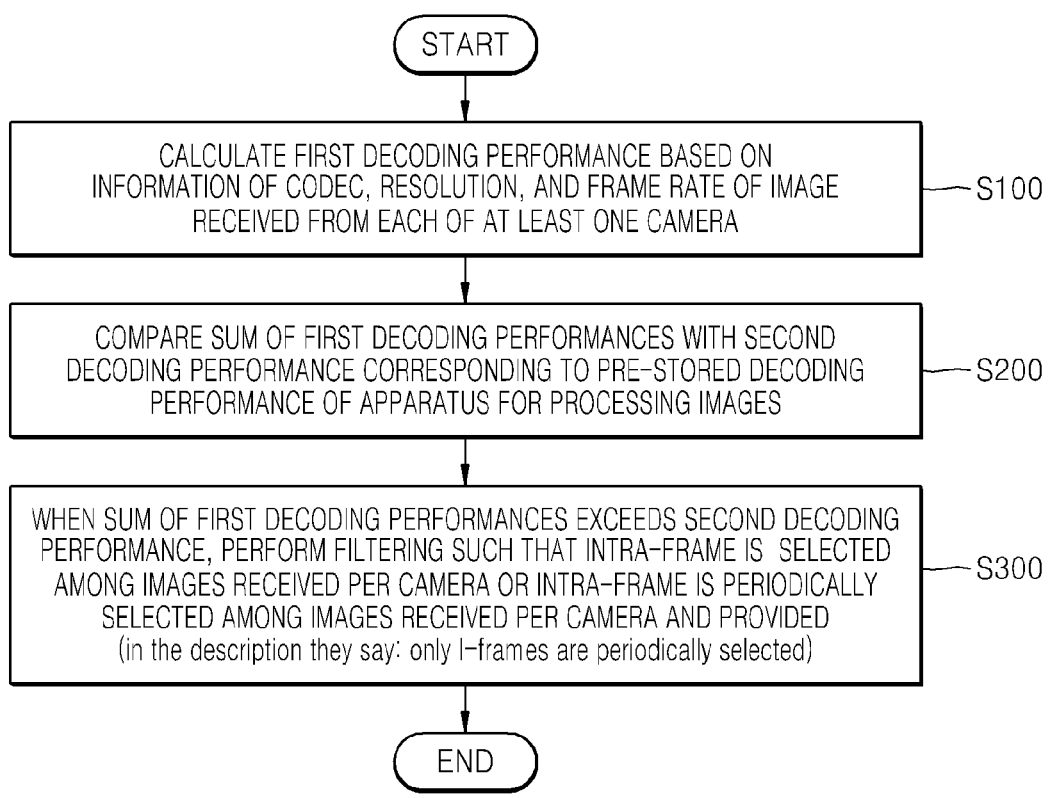
FIG. 3 is a flowchart illustrating an operation of a method of processing images according to an exemplary embodiment.

FIG. 3 is a flowchart illustrating a method of processing images, according to an exemplary embodiment. Repeated descriptions that have already been provided with reference to FIGS. 1 and 2 are omitted below.

Referring to FIG. 3, the image processing unit 300 calculates a first decoding performance by multiplying information about a codec, a resolution and a frame rate of an image received through at least one network camera 100 (S100). At this stage, the image processing unit 300 may select at least one network camera 100 capturing images, which the user desires to monitor, and receive encoded images captured by the selected network camera 100. The first decoding performance may vary depending on the codec of images, such as H.264, MPEG-4, and JPEG. Weight values for calculating the first decoding performance are differently assigned depending on a compression rate and an amount of computations per type of codec, and 1.0 may be applied to H.264, 0.7 to MPEG-4, and 0.5 to JPEG. If the first decoding performance is calculated by a same codec, a resolution may mostly affect the first decoding performance. The first decoding performance, when obtained by a same codec, is proportional to the resolution. Lastly, the first decoding performance may vary by the number of input frames per second, or by the frame rate, which are input for decoding by a hardware codec as well as a software codec.

After the first decoding performance is calculated, the image processing unit 300 compares the sum of the respective first decoding performances for image frames received from the at least one camera with a second decoding performance corresponding to a pre-stored decoding performance of the image processing unit 300 (S200). For example, when the pre-stored second decoding performance is 4CH×H.264×(1920×1080)×30 FPS and the sum of respective first decoding performances for images received from selected first through fourth network is 4CH×H.264× (1920×1080)×30 FPS, the sum of the respective first decoding performances does not exceed the second decoding performance. However, if the sum of the respective first decoding performances for images received from the first through third cameras is 3CH×H.264×(1920×1080)×30 FPS and the first decoding performance for images received from the fourth network camera is 1CH×H.264×(1920×1080)×60 FPS, the sum of the respective first decoding performances for images received from the first through fourth network cameras exceeds the second decoding performance.

If the sum of the respective first decoding performances exceeds the second decoding performance, the image processing unit 300 performs filtering such that only I-frames are selected among image frames received from the selected cameras or only I-frames are periodically selected among image frames received from the selected cameras (S300). At the time of filtering, the image processing unit 300 controls filtering of image frames received by each of the selected cameras. The image processing unit 300 may control the filtering such that only I-frames are selected among image frames received from cameras having the highest first decoding performance or only I-frames from these cameras are periodically selected. Also, the image processing unit 300 may control the filtering such that only I-frames are selected among image frames received from cameras having the lowest first decoding performance or only I-frames from these cameras are periodically selected. In addition, the image processing unit 300 may select cameras of which image frames are to be filtered by the filtering and control the filtering such that only I-frames among image frames received from the selected cameras may be selected or only I-frames from these cameras are periodically selected. The cameras, of which the image frames are to be filtered by the filtering unit 307, may be selected by the user either in an ascending order from the first camera, in a descending order from the $n^{th}$ camera, or in a random order. The image processing unit 300 may control a frequency of filtering of image frames received by a small number of or specific cameras having the highest first decoding performance. For example, if the frame rate of image frames received from the first camera is 30 FPS and a unit GOP is 15, the filtering may be applied to provide two I-frames per second to the decoder 313. However, the image processing unit 300 may control the filtering with weight values to provide one I-frame per second to the decoder 313 or to provide one I-frame per two seconds to the decoder 313.

After these processes, the image processing unit 300 performs decoding of filtered I-frames or unfiltered image frames, adjusts a size of the decoded image frames, adjusts synchronization of image frames and audio, synthesizes the image frames, and produces one final output image to perform a series of processes to display one final output image per specifications of the display unit 400.

As described above, according to the one or more exemplary embodiments, monitoring images without picture-gaps may be achieved even when the internally preset decoding performance is exceeded at a time of decoding images received from at least one camera, by selective decoding of specific frames from received images and by preventing or minimizing situations of full-queues and frame drops.

In addition, other exemplary embodiments may also be implemented through computer-readable code/instructions in/on a medium, e.g., a computer-readable medium, to control at least one processing element to implement any above-described embodiment. The medium can correspond to any medium/media permitting the storage and/or transmission of the computer-readable code.

The computer-readable code can be recorded/transferred on a medium in a variety of ways, with examples of the medium including recording media, such as magnetic storage media (e.g., ROM, floppy disks, hard disks, etc.) and optical recording media (e.g., CD-ROMs, DVDs, etc.), and transmission media such as Internet transmission media. Thus, the medium may be such a defined and measurable structure including or carrying a signal or information, such as a device carrying a bitstream according to one or more exemplary embodiments. The media may also be a distributed network, so that the computer-readable code is stored/transferred and executed in a distributed fashion. Furthermore, the processing element could include a processor or a computer processor, and processing elements may be distributed and/or included in a single device.

It should be understood that the exemplary embodiments described above should be considered in a descriptive sense only and not for purposes of limitation. Descriptions of features or aspects within each embodiment should typically be considered as available for other similar features or aspects in other embodiments. For example, in the above embodiments, although the first decoding performance of a camera or a corresponding channel is calculated by multiplying information about a codec, a resolution and a frame rate of an image or images received from the camera or through the channel, the first decoding performance may be calculated by a different operation, other than multiplication, of one or more of the codec, the resolution and the frame rate, according to another exemplary embodiment. Also, the first decoding performance may be calculated based on characteristics other than the codec, the resolution and the frame rate, according to still another exemplary embodiment. While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. An image processing apparatus connected to at least one camera, the apparatus comprising at least one processor to implement: a performance calculating unit configured to calculate a first performance about at least one of a codec, a resolution and a frame rate of image frames which are received from the at least one camera; and a filtering unit configured to filter the received image frames to select image frames for decoding from among the received image frames, based on a result of the calculation of the first performance; wherein the at least one camera comprises a plurality of cameras, and wherein the filtering unit is configured to select the image frames for decoding by comparing a sum of respective first performances with respect to the plurality of cameras about at least one of a codec, a resolution and a frame rate of image frames which are received from the cameras calculated by the performance calculating unit with a second performance corresponding to a decoding performance of the image processing apparatus about at least one of a codec, a resolution and a frame rate which is preset for the image processing apparatus to process image frames.

2. The image processing apparatus of claim 1, wherein the filtering unit is configured to select the image frames for decoding, when the sum exceeds the second performance.

3. The image processing apparatus of claim 1, wherein the performance calculating unit is configured to calculate the first performance by multiplying a weight value assigned to the codec, the resolution and the frame rate of the received image frames.

4. The image processing apparatus of claim 3, wherein different weight values are assigned to the codec depending on a type of the codec.

5. The image processing apparatus of claim 1, wherein the selected image frames for decoding are predetermined frames from among image frames received from each of the at least one camera.

6. The image processing apparatus of claim 1, wherein the performance calculating unit is configured to calculate the first performance about at least two of a codec, a resolution and a frame rate of image frames which are received from the at least one camera, and
wherein the filtering unit is configured to filter the received image frames to select the image frames for the decoding from among the received image frames by comparing the first performance with a second performance corresponding to a decoding performance of the image processing apparatus about at least two of a codec, a resolution and a frame rate which are preset for the image processing apparatus to process image frames.

7. The image processing apparatus of claim 1, wherein the selected image frames are image frames received from a camera having the highest or lowest performance with respect to the at least one of a codec, a resolution and a frame rate of image frames among the at least one camera.

8. The image processing apparatus of claim 1, wherein the filtering unit is configured to filter the received image frames to select the image frames for the decoding from among the received image frames by comparing the first performance with a second performance corresponding to a decoding performance of the image processing apparatus about at least one of a codec, a resolution and a frame rate which is preset for the image processing apparatus to process image frames.

9. The image processing apparatus of claim 1, wherein the selected image frames for decoding are predetermined frames from among image frames received from each of the at least one camera.

10. A method of processing image frames received at an image processing apparatus from at least one camera, the method comprising: calculating a first performance about a codec, a resolution and a frame rate of the received image frames; and filtering the received image frames to select image frames for decoding from among the received image frames, based on a result of the calculation of the first performance; wherein the at least one camera comprises a plurality of cameras, and wherein the filtering is performed based on a result of comparing a sum of respective first performances with respect to the plurality of cameras about at least one of a codec, a resolution and a frame rate of image frames which are received from the cameras calculated by the performance calculating unit with a second performance corresponding to a decoding performance of the image processing apparatus about at least one of a codec, a resolution and a frame rate which is preset for the image processing apparatus to process image frames.

11. The method of claim 10, wherein the filtering is performed when the sum exceeds the second performance.

12. The method of claim 10, wherein the first performance is calculated by multiplying a weight value assigned to the codec, the resolution and the frame rate of the received image frames.

13. The method of claim 12, wherein different weight values are assigned to the codec depending on ta type of the codec.

14. The method of claim 10, wherein, in the filtering, the image frames for decoding is periodically selected.

15. The method of claim 14, wherein the calculating the first performance comprises calculating the first performance about at least two of a codec, a resolution and a frame rate of image frames which are received from the at least one camera, and
wherein the filtering the received image frames comprises filtering the received image frames to select the image frames for the decoding from among the received image frames by comparing the first performance with the second performance corresponding to the decoding performance of the image processing apparatus about at least two of a codec, a resolution and a frame rate which are preset for the image processing apparatus to process image frames.

16. The method of claim 10, wherein the selected image frames are image frames received from a camera having the highest or lowest performance with respect to the at least one of a codec, a resolution and a frame rate of image frames among the at least one camera.

17. The method of claim 10, wherein the filtering is performed based on a result of comparing the first performance with a second performance corresponding to a decoding performance of the image processing apparatus about at least one of a codec, a resolution and a frame rate which is preset for the image processing apparatus to process image frames.

18. The method of claim 10, wherein the selected image frames for decoding are predetermined frames from among image frames received from each of the at least one camera.

* * * * *